United States Patent
Shaw et al.

(10) Patent No.: US 10,421,473 B2
(45) Date of Patent: Sep. 24, 2019

(54) SYSTEM, METHOD, AND APPARATUS FOR PROVIDING BACKUP OF ELECTRONIC INSTRUCTION TO A LOCOMOTIVE OR TRAIN

(71) Applicant: Westinghouse Air Brake Technologies Corporation, Wilmerding, PA (US)

(72) Inventors: Karen A. Shaw, Cedar Rapids, IA (US); Thomas Paul Spiegelhalter, Jr., Cedar Rapids, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 197 days.

(21) Appl. No.: 15/280,207

(22) Filed: Sep. 29, 2016

(65) Prior Publication Data

US 2018/0086357 A1 Mar. 29, 2018

(51) Int. Cl.
*B61L 27/00* (2006.01)
*G10L 15/26* (2006.01)
*H04L 29/08* (2006.01)
*B61L 15/00* (2006.01)

(52) U.S. Cl.
CPC ....... *B61L 27/0077* (2013.01); *B61L 15/0018* (2013.01); *B61L 27/0011* (2013.01); *B61L 27/0038* (2013.01); *G10L 15/26* (2013.01); *H04L 67/12* (2013.01)

(58) Field of Classification Search
CPC .... B61L 3/00; B61L 3/16; B61L 15/00; B61L 23/04; B61L 23/08; B61L 23/22; B61L 27/00; B61L 27/04
See application file for complete search history.

(56) References Cited

U.S. PATENT DOCUMENTS 9,102,341 B2 * 8/2015 Malone, Jr. ........... B61L 23/044

* cited by examiner

*Primary Examiner* — Robert J McCarry, Jr.
(74) *Attorney, Agent, or Firm* — The Webb Law Firm

(57) ABSTRACT

Disclosed is a system, method, and apparatus for communicating instructions to at least one locomotive approaching or traversing a predetermined zone. The system includes a first communication device located at or associated with the predetermined zone, configured to communicate audio data from a field operator, and a second communication device located on or associated with the at least one locomotive. The system includes at least one processor that is programmed or configured to receive the audio data from the first communication device, convert at least a portion of the audio data to text data, and directly or indirectly transmit at least one message to the second communication device. The system further includes a locomotive display device in the at least one locomotive configured to display at least a portion of the at least one message received by the second communication device to an operator of the at least one locomotive.

20 Claims, 4 Drawing Sheets

SYSTEM, METHOD, AND APPARATUS FOR PROVIDING BACKUP OF ELECTRONIC INSTRUCTION TO A LOCOMOTIVE OR TRAIN

BACKGROUND OF THE INVENTION

Field of the Invention

Disclosed embodiments relate generally to vehicle systems, such as railway systems including trains travelling in a track or rail network, and in particular to a system and method of communicating instructions to a locomotive approaching or traversing a predetermined zone.

Description of Related Art

Vehicle systems and networks exist throughout the world, and, at any point in time, a multitude of vehicles, such as cars, trucks, buses, trains, and the like, are travelling throughout the system and network. With reference to trains travelling in a track network, a train may approach a geographic region or zone in which its travel must be restricted or monitored. One such type of region is a construction or work zone. When a train approaches a work zone, a field operator, e.g., an employee-in-charge (EIC), is responsible for instructing the train on when and how to proceed through the work zone. In a fully operational system, the field operator communicates to the train electronically through an in-field computer, e.g., an employee-in-charge terminal, which generates instructions and communicates to the train directly or indirectly through a dispatch center. The dispatch center may keep a log of communications and forward the instructions to the train's locomotive operator.

Should the field computer fail, or fail to communicate with the locomotive and/or dispatch center, voice-over-radio communication is the only alternative to communicate instructions from the field operator to the locomotive operator. These verbal instructions inform the locomotive operator how to proceed, such as when to enter the work zone, at what speed to travel, if there are any controlled stops, etc. Although the locomotive's operations may be logged by an on-board computer, e.g., a train management computer, the verbal instructions from the field operator would not be recorded. Without records of the verbal instructions, there is little ability to verify that a locomotive was given permission to enter or move, that proper instructions were given, or if either operator followed protocol. There is a need for a backup system that provides record-keeping and accountability when a field computer is unable to communicate in a train communication network.

SUMMARY OF THE INVENTION

Generally, provided is a system, method, and apparatus for communicating instructions to at least one locomotive approaching or traversing a predetermined zone. Preferably, provided is a system, method, and apparatus for receiving audio data, converting at least a portion of the audio data to text data, and communicating or facilitating the communication of the text data for review of its conversion. Preferably, provided is a system, method, and apparatus for directly or indirectly transmitting at least one message, which includes at least a portion of the text data, at least a portion of the audio data, or any combination thereof, to a second communication device located on or associated with the at least one locomotive. Preferably, provided is a system, method, and apparatus for storing at least a portion of the at least one message in at least one database.

According to one preferred and non-limiting embodiment or aspect, provided is a system for communicating instructions to at least one locomotive approaching or traversing a predetermined zone. The system includes a first communication device located at or associated with the predetermined zone and configured to communicate audio data from a field operator. The system also includes a second communication device located on or associated with the at least one locomotive, and at least one processor. The at least one processor is programmed or configured to receive the audio data from the first communication device, convert at least a portion of the audio data to text data, and directly or indirectly transmit at least one message to the second communication device. The at least one message includes at least one of the following: at least a portion of the text data, at least a portion of the audio data, or any combination thereof. The system further includes a locomotive display device in the at least one locomotive configured to display at least a portion of the at least one message received by the second communication device to an operator of the at least one locomotive. The system further includes at least one database programmed or configured to receive and store at least a portion of the at least one message.

In further preferred and non-limiting embodiments or aspects, the at least one database may be further programmed or configured to store communication data related to the at least one message. The communication data may include at least one of the following: geographic data, locomotive identification data, time data, field operator data, locomotive operator data, or any combination thereof. The at least one processor may be further programmed or configured to, after directly or indirectly transmitting the at least one message, store in the at least one database action data of the at least one locomotive while the at least one locomotive approaches or operates within the predetermined zone. The action data may include at least one of the following: locomotive location data, locomotive speed data, locomotive direction data, responsive communication data, or any combination thereof.

In further preferred and non-limiting embodiments or aspects, the system may include a remote display device associated with a dispatch center, the remote display device programmed or configured to receive the text data from the at least one processor and present the text data to a personnel for review. The system may also include a speaker associated with the dispatch center, the speaker configured to receive the audio data from the at least one processor and present the audio data to the personnel for comparison to the text data. The at least one processor may be further programmed or configured to, in response to receiving an instruction from the personnel, directly or indirectly transmit the at least one message. The at least one processor may be located at or associated with the dispatch center. The at least one processor may also be positioned remotely from the predetermined zone and the dispatch center.

In further preferred and non-limiting embodiments or aspects, the system may include a field display device positioned in the predetermined zone. The field display device may be programmed or configured to receive the text data from the at least one processor and present the text data to the field operator for review and comparison to the audio data that was communicated to the at least one processor by the field operator. The at least one processor may also be programmed or configured to, in response to receiving an instruction from the field operator, directly or indirectly transmit the at least one message. The at least one processor may be further programmed or configured to encrypt the at least one message prior to directly or indirectly transmitting the at least one message.

According to one preferred and non-limiting embodiment or aspect, provided is a method for communicating instructions to at least one locomotive approaching or traversing a predetermined zone. The method includes receiving audio data from a first communication device, the first communication device located at or associated with the predetermined zone and the message spoken by a field operator. The method also includes converting at least a portion of the audio data to text data and communicating or facilitating the communication of the text data for display to a dispatch center personnel or the field operator for review of the converting step. The method further includes, in response to receiving an instruction from the dispatch center personnel or the field operator, directly or indirectly transmitting at least one message to a second communication device located on or associated with the at least one locomotive. The at least one message includes at least one of the following: at least a portion of the text data, at least a portion of the audio data, or any combination thereof. The method further includes storing at least a portion of the at least one message in at least one database.

In further preferred and non-limiting embodiments or aspects, the method may include storing in the at least one database communication data related to the at least one message. The communication data may include at least one of the following: geographic data, locomotive identification data, time data, field operator data, locomotive operator data, or any combination thereof. The method may further include, after directly or indirectly transmitting the at least one message, storing in the at least one database action data of the at least one locomotive while the at least one locomotive approaches or operates within the predetermined zone. The action data may include at least one of the following: locomotive location data, locomotive speed data, locomotive direction data, responsive communication data, or any combination thereof.

In further preferred and non-limiting embodiments or aspects, the method may include communicating or facilitating the communication of the audio data along with the text data to the dispatch center personnel or the field operator for review of the converting step. The method may also include encrypting at least one of the audio data and the text data prior to communicating or facilitating the communication of the audio data along with the text data to the dispatch center personnel or the field operator for review of the converting step. The method may further include encrypting the at least one message prior to directly or indirectly transmitting the at least one message to the second communication device.

According to one preferred and non-limiting embodiment or aspect, provided is an apparatus for communicating instructions to at least one locomotive approaching or traversing a predetermined zone. The apparatus includes at least one non-transitory computer-readable medium having program instructions stored thereon that, when executed by at least one processor, cause the at least one processor to receive audio data from a first communication device. The first communication device is located at or associated with the predetermined zone and the message is spoken by a field operator. The program instructions cause the at least one processor to convert at least a portion of the audio data to text data and communicate or facilitate the communication of the text data for display to a dispatch center personnel or the field operator for review of the converting step. The program instructions further cause the at least one processor to, in response to receiving an instruction from the dispatch center personnel or the field operator, directly or indirectly transmit at least one message to a second communication device located on or associated with the at least one locomotive. The at least one message includes at least one of the following: at least a portion of the text data, at least a portion of the audio data, or any combination thereof. The program instructions further cause the at least one processor to store at least a portion of the at least one message in at least one database.

In further preferred and non-limiting embodiments or aspects, the program instructions further may cause the at least one processor to store communication data related to the at least one message. The communication data may include at least one of the following: geographic data, locomotive identification data, time data, field operator data, locomotive operator data, or any combination thereof. The program instructions may further cause the at least one processor to, after directly or indirectly transmitting the at least one message, store action data of the at least one locomotive while the at least one locomotive approaches or operates within the predetermined zone. The action data may include at least one of the following: locomotive location data, locomotive speed data, locomotive direction data, responsive communication data, or any combination thereof. The program instructions may further cause the at least one processor to encrypt the at least one message prior to directly or indirectly transmitting the at least one message.

Other preferred and non-limiting embodiments or aspects of the present invention will be set forth in the following numbered clauses:

Clause 1: A system for communicating instructions to at least one locomotive approaching or traversing a predetermined zone, comprising: a first communication device located at or associated with the predetermined zone and configured to communicate audio data from a field operator, a second communication device located on or associated with the at least one locomotive; at least one processor programmed or configured to: receive the audio data from the first communication device; convert at least a portion of the audio data to text data; and directly or indirectly transmit at least one message to the second communication device, wherein the at least one message comprises at least one of the following: at least a portion of the text data, at least a portion of the audio data, or any combination thereof; a locomotive display device in the at least one locomotive configured to display at least a portion of the at least one message received by the second communication device to an operator of the at least one locomotive, and at least one database programmed or configured to receive and store at least a portion of the at least one message.

Clause 2: The system of clause 1, wherein the at least one database is further programmed or configured to store communication data related to the at least one message, the communication data comprising at least one of the following: geographic data, locomotive identification data, time data, field operator data, locomotive operator data, or any combination thereof.

Clause 3: The system of clauses 1 or 2, wherein the at least one processor is further programmed or configured to, after directly or indirectly transmitting the at least one message, store in the at least one database action data of the at least one locomotive while the at least one locomotive approaches or operates within the predetermined zone, the action data comprising at least one of the following: locomotive location data, locomotive speed data, locomotive direction data, responsive communication data, or any combination thereof.

Clause 4: The system of any of clauses 1-3, further comprising: a remote display device associated with a dispatch center, the remote display device programmed or configured to receive the text data from the at least one processor and present the text data to a personnel for review, and a speaker associated with the dispatch center, the speaker configured to receive the audio data from the at least one processor and present the audio data to the personnel for comparison to the text data.

Clause 5: The system of any of clauses 1-4, wherein the at least one processor is further programmed or configured to, in response to receiving an instruction from the personnel, directly or indirectly transmit the at least one message.

Clause 6: The system of any of clauses 1-5, wherein the at least one processor is located at or associated with the dispatch center.

Clause 7: The system of any of clauses 1-6, wherein the at least one processor is positioned remotely from the predetermined zone and the dispatch center.

Clause 8: The system of any of clauses 1-7, further comprising a field display device positioned in the predetermined zone, the field display device programmed or configured to receive the text data from the at least one processor and present the text data to the field operator for review and comparison to the audio data that was communicated to the at least one processor by the field operator.

Clause 9: The system of any of clauses 1-8, wherein the at least one processor is further programmed or configured to, in response to receiving an instruction from the field operator, directly or indirectly transmit the at least one message.

Clause 10: The system of any of clauses 1-9, wherein the at least one processor is further programmed or configured to encrypt the at least one message prior to directly or indirectly transmitting the at least one message.

Clause 11: A method for communicating instructions to at least one locomotive approaching or traversing a predetermined zone, comprising: receiving audio data from a first communication device, the first communication device located at or associated with the predetermined zone and the message spoken by a field operator; converting at least a portion of the audio data to text data; communicating or facilitating the communication of the text data for display to a dispatch center personnel or the field operator for review of the converting step; in response to receiving an instruction from the dispatch center personnel or the field operator, directly or indirectly transmitting at least one message to a second communication device located on or associated with the at least one locomotive, wherein the at least one message comprises at least one of the following: at least a portion of the text data, at least a portion of the audio data, or any combination thereof; and storing at least a portion of the at least one message in at least one database.

Clause 12: The method of clause 11, further comprising storing in the at least one database communication data related to the at least one message, the communication data comprising at least one of the following: geographic data, locomotive identification data, time data, field operator data, locomotive operator data, or any combination thereof.

Clause 13: The method of clauses 11 or 12, further comprising, after directly or indirectly transmitting the at least one message, storing in the at least one database action data of the at least one locomotive while the at least one locomotive approaches or operates within the predetermined zone, the action data comprising at least one of the following: locomotive location data, locomotive speed data, locomotive direction data, responsive communication data, or any combination thereof.

Clause 14: The method of any of clauses 11-13, further comprising communicating or facilitating the communication of the audio data along with the text data to the dispatch center personnel or the field operator for review of the converting step.

Clause 15: The method of any of clauses 11-14, further comprising encrypting at least one of the audio data and the text data prior to communicating or facilitating the communication of the audio data along with the text data to the dispatch center personnel or the field operator for review of the converting step.

Clause 16: The method of any of clauses 11-15, further comprising encrypting the at least one message prior to directly or indirectly transmitting the at least one message to the second communication device.

Clause 17: An apparatus for communicating instructions to at least one locomotive approaching or traversing a predetermined zone, the apparatus comprising at least one non-transitory computer-readable medium having program instructions stored thereon that, when executed by at least one processor, cause the at least one processor to: receive audio data from a first communication device, the first communication device located at or associated with the predetermined zone and the message spoken by a field operator; convert at least a portion of the audio data to text data; communicate or facilitate the communication of the text data for display to a dispatch center personnel or the field operator for review of the converting step; in response to receiving an instruction from the dispatch center personnel or the field operator, directly or indirectly transmit at least one message to a second communication device located on or associated with the at least one locomotive, wherein the at least one message comprises at least one of the following: at least a portion of the text data, at least a portion of the audio data, or any combination thereof; and store at least a portion of the at least one message in at least one database.

Clause 18: The apparatus of clause 17, wherein the program instructions further cause the at least one processor to store communication data related to the at least one message, the communication data comprising at least one of the following: geographic data, locomotive identification data, time data, field operator data, locomotive operator data, or any combination thereof.

Clause 19: The apparatus of clauses 17 or 18, wherein the program instructions further cause the at least one processor to, after directly or indirectly transmitting the at least one message, store action data of the at least one locomotive while the at least one locomotive approaches or operates within the predetermined zone, the action data comprising at least one of the following: locomotive location data, locomotive speed data, locomotive direction data, responsive communication data, or any combination thereof.

Clause 20: The apparatus of any of clauses 17-19, wherein the program instructions further cause the at least one processor to encrypt the at least one message prior to directly or indirectly transmitting the at least one message.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
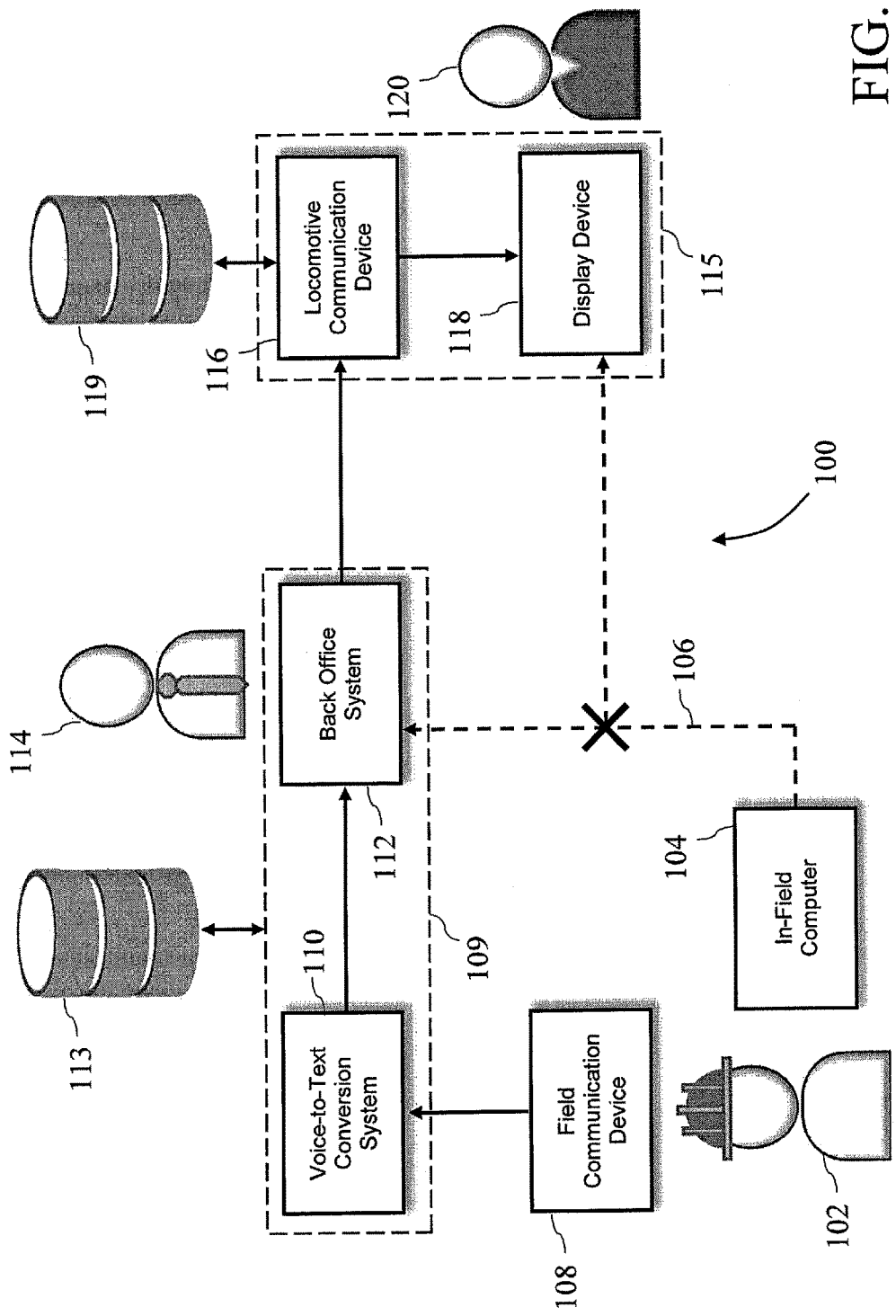
FIG. 1 is a schematic diagram of one embodiment or aspect of a system for communicating instructions to a locomotive approaching or traversing a predetermined zone, according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and process illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

With specific reference to FIG. 1, and in one preferred and non-limiting embodiment or aspect, provided is a schematic diagram of a communication network 100 for communicating instructions from a field operator 102, e.g., an employee-in-charge (EIC) that oversees a work zone, to a locomotive operator 120. The communication network 100 may be employed in situations where one or more locomotives 115 approach a predetermined zone, e.g., a construction area, in which a locomotive 115 must be monitored or given permission to operate. It will be appreciated that the communication network 100 may be employed for other situations in which a locomotive 115 must maintain communication with a field operator 102. Messages from the field operator 102 may include instructions for how the locomotive 115 may approach the zone, proceed through the zone, exit the zone, and/or the like. In a fully operational communication network 100, the field operator 102 uses an in-field computer 104, e.g., an EIC terminal, to communicate with a locomotive 115 via a communicative connection 106, e.g., two-way radio, that communicates to the locomotive 115 directly, or indirectly by way of a dispatch center 109. The communication from the in-field computer 104 is received by a locomotive communication device 116 that may include or may be associated with a processor, e.g., an on-board computer, such as a head-end unit (HEU), an end-of-train device (EOT), or any like computer or processor. The locomotive communication device 116 is communicatively connected to a display device 118, e.g., a heads-up display, a graphical interface, a computer monitor, a tablet screen, and/or the like. At least a portion of the communication may be displayed on the display device 118. It will be appreciated that other configurations are possible.

With further reference to FIG. 1, and in a further preferred and non-limiting embodiment or aspect, if the communicative connection 106 between the in-field computer 104 and the dispatch center 109 and/or locomotive 115 fails to function, the communication network 100 employs an alternative means of verified communication according to the principles of the present invention. In prior art systems, the field operator 102 would engage the locomotive operator 120 in direct field-to-locomotive radio communications (not shown); however, these communications may not necessarily be verified, validated, or recorded. Although "read and repeat" procedures may be used, there is not widespread recording of text-based communications and event logs. In the communication network 100 of the present invention, the field operator 102 uses a field communication device 108, e.g., a transceiver, a radio, a phone, a tablet, a laptop, and/or any like communication device, to communicate an audio message to a voice-to-text conversion system 110, which includes at least a processor that is programmed or configured to convert, e.g., transcribe, audio data into text data. The conversion system 110 may be associated with or integral to the communication device 108, such as a native software application stored on the communication device 108. Alternatively, the conversion system 110 may be associated with the dispatch center 109, such as a transcription program on a back office system 112 server. Further, the conversion system 110 may be associated with an independent platform, location, or service that is remote from the communication device 108 and the dispatch center 109. Other configurations or arrangements are possible.

With further reference to FIG. 1, and in a further preferred and non-limiting embodiment or aspect, the voice-to-text conversion system 110 generates text data from the audio data and communicates the text data, alone or in combination with the audio data, to at least one dispatch center personnel 114 associated with the dispatch center 109. The text data may be stored in a database 113 associated with the dispatch center 109. A personnel 114 associated with the dispatch center 109 may review the text data on a display device for coherency, procedural validity, textual quality, and/or conversion accuracy. The dispatch center 109 may also be equipped with an audio device, e.g., a speaker, to allow the personnel 114 to compare the audio data to the text data. It will be appreciated that the review of the text data may alternatively be conducted by the field operator 102, by the locomotive operator 120, or automatically by a processor. For example, the field operator 102 may speak an audio message, and the audio message may be converted by the communication device 108, which also displays the text data to the field operator 102 for review and approval. In a further example, the voice-to-text conversion and review may occur entirely within the dispatch center 109 or the locomotive 115. Other configurations or arrangements are possible.

With further reference to FIG. 1, and in a further preferred and non-limiting embodiment or aspect, the verified text data is communicated to a locomotive communication device 116, which may be the same or different from the locomotive communication device 116 configured to receive communications from the in-field computer 104. The text data may be then stored in a local database 119. The locomotive communication device 116 provides the text data for display on the locomotive display device 118, and the text data may be read by the locomotive operator 120. The audio data may also be communicated to a locomotive communication device 116 for playback on an audio device for the locomotive operator 120. At this stage, the message from the field operator 102 has been converted to text, verified by a personnel 114 or operator 102, 120, and communicated to the locomotive operator 120. The locomotive operator 120 may then act on the instructions and continue to receive further communications from the field operator 102, or likewise use a locomotive communication device 116 to communicate back through the system 100. It will be appreciated that the voice-to-text conversion system 110 may also be employed to convert the locomotive operator's 120 audio communications, and the dispatch center 109 may further review the communications from the locomotive operator 120. Other configurations are possible.

Figure 2:
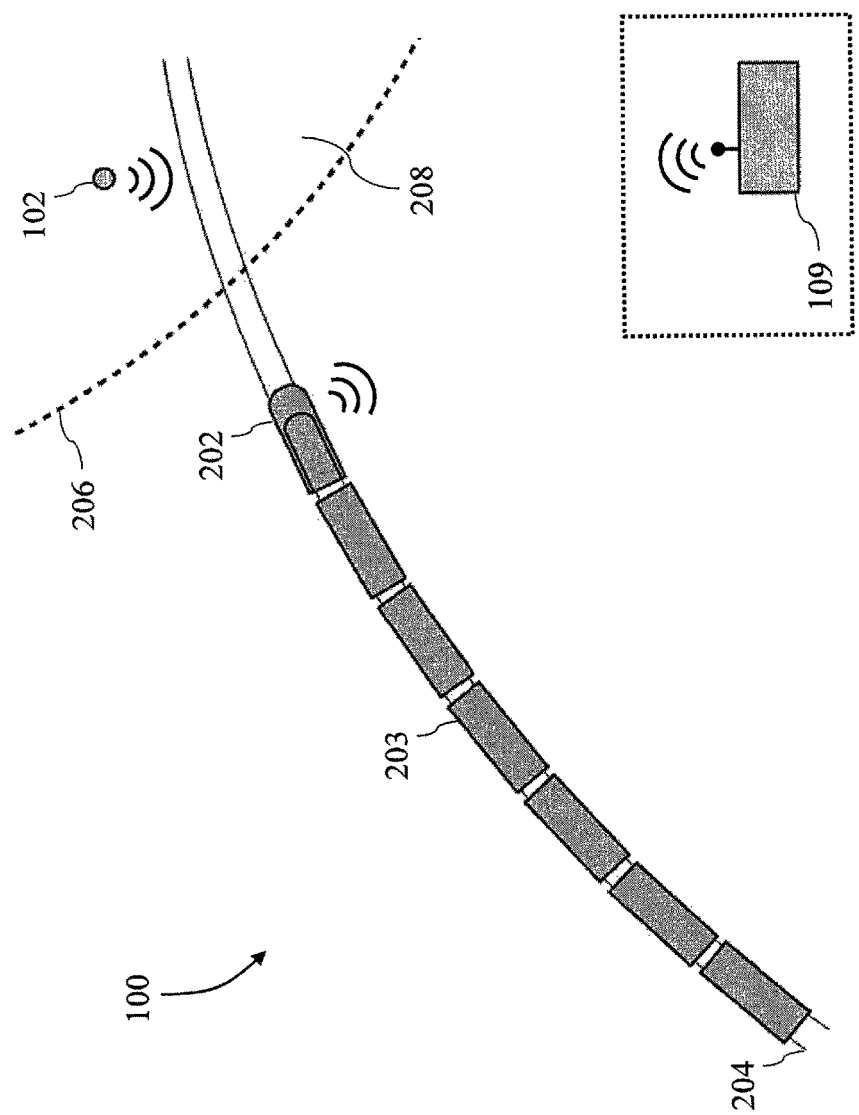
FIG. 2 is a schematic diagram of one embodiment or aspect of a system for communicating instructions to a locomotive approaching or traversing a predetermined zone, according to the principles of the present invention.

In reference to FIG. 2, and in one preferred and non-limiting embodiment or aspect, provided is a schematic diagram of a communication network 100 in an example interaction of a locomotive 202 with a train on a railroad track 204 approaching the boundary 206 of a predetermined zone 208, e.g., a construction area. In the example depiction, the field operator 102 is unable to use an EIC terminal to communicate instructions to the train 202 through the dispatch center 109. As the train 202 nears the boundary 206 of a predetermined zone 208, the field operator 102, e.g., an EIC, uses a communication device to communicate an audio message to a dispatch center 109. The audio data of the message is converted to text data by a processor, which may be associated with the field operator 102, the dispatch center 109, the locomotive 202, the train 203, or a site independent of the preceding locations. After conversion, a personnel associated with the dispatch center 109 may review the text data to ensure that the text was properly converted. For security, the field communication device associated with the field operator 102 may encrypt the audio data being communicated to the dispatch center 109. The audio data and/or the text data may also be encrypted at the dispatch center 109. It will be appreciated that the locomotive operator or the field operator 102 may alternatively review the converted text, either independently of or in comparison to the audio data. In response to approval by a personnel or an operator, the communication device associated with field operator 102, the dispatch center 109, or a remote processor may communicate the text data, alone or in combination with the audio data, to the locomotive 202, which may be equipped with its own communication device. The text data, the audio data, geographic data, locomotive 202 identification data, time data, field operator 102 data, locomotive operator data, or any combination thereof may be stored in one or more databases associated with the locomotive 202, the train 203, the dispatch center 109, or the field operator 102. It will be appreciated that other arrangements or configurations are possible.

With further reference to FIG. 2, and in a further preferred and non-limiting embodiment or aspect, the personnel or operator reviewing the text data may communicate to the dispatch center 109 or the field operator 102 that the message, comprising audio data and/or text data, was invalid, improper, incomplete, illegible, and/or the like, and request a new message to be sent from the field operator 102. Additionally, the dispatch center 109 may monitor and record the movements and actions of the locomotive 202 subsequent to the locomotive 202 receiving a valid and complete message to verify that the field operator's 102 instructions were followed. The locomotive's 202 actions may be stored as one or more types of action data, such as locomotive location data, locomotive speed data, locomotive direction data, responsive communication data, or any combination thereof. It will be appreciated that the communication network may be employed for more than one field operator 102, locomotive 202, train 203, and/or dispatch center 109.

Figure 3:
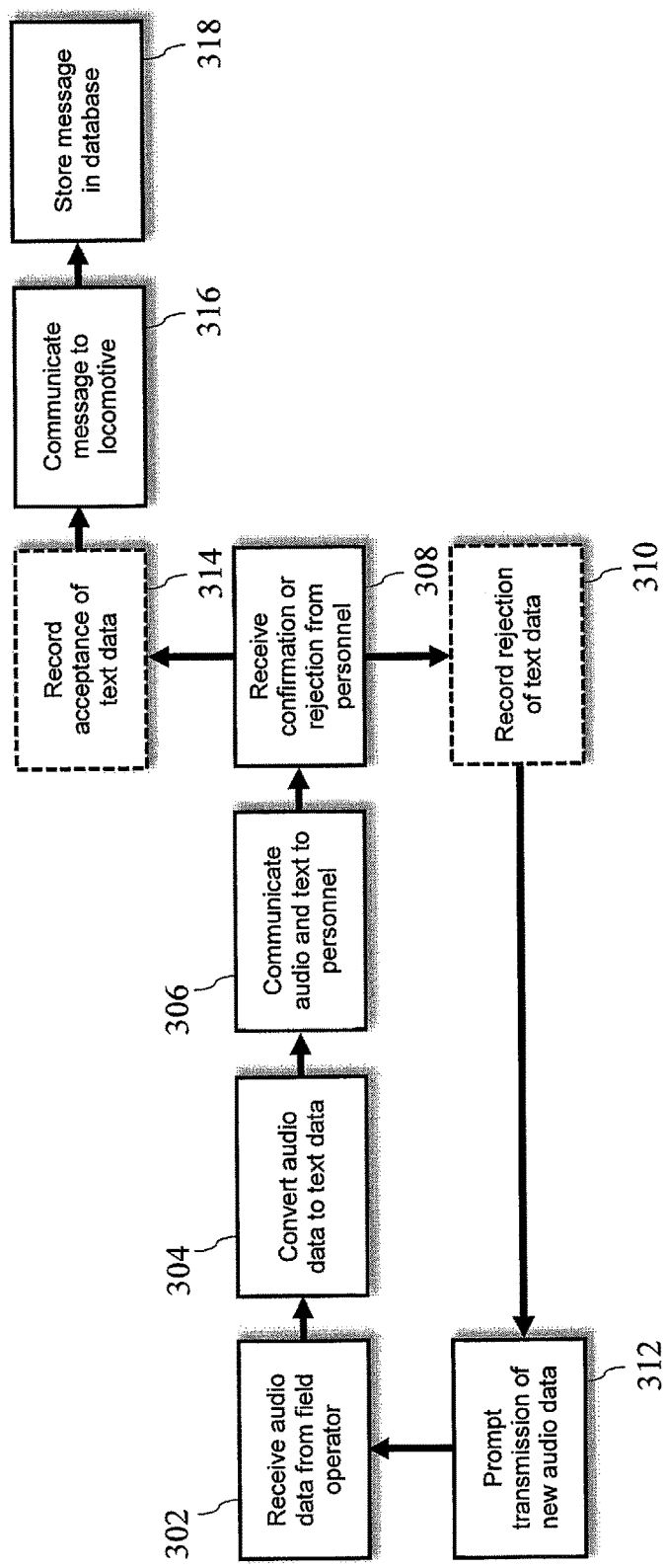
FIG. 3 is a step diagram of a method for communicating instructions to a locomotive approaching or traversing a predetermined zone, according to the principles of the present invention; and, FIG. 4 is a set of step diagrams of a method for communicating instructions to a locomotive approaching or traversing a predetermined zone, according to the principles of the present invention.

In reference to FIG. 3, and in one preferred and non-limiting embodiment or aspect, provided is a step diagram of a method of communication for the above-described communication network 100. The method depicted is operated by at least one processor associated with or in communication with the dispatch center, but other locations, arrangements, and configurations are possible. At step 302, the processor receives a message from a field operator that includes, at least partially, audio data. The processor then converts the audio data to text data at step 304, which may include a third-party voice-to-text transcription service or a native software application operated by the processor. After the conversion of step 304, the audio data and text data is provided to a personnel for review, in step 306. In step 308, the personnel may review the text data to determine if the text is a valid instruction, an accurate transcription, and/or the like, and confirm or reject the text conversion, which is noted by the processor. It will be appreciated that the review of the text data may also be automated in step 308. If the text data is rejected, the processor may record the rejection of the text data in a database at step 310 and prompt transmission of a new message from the field operator at step 312; thereafter, the process may be repeated from step 302. If the text is accepted, the processor may record the acceptance of the text data in a database at step 314 and communicate the text data to the target locomotive at step 316. The processor may encrypt the text data prior to communicating it to the locomotive in step 316. It may also transmit the audio data together with the text data. The text data is also stored in a database to provide a record of the message communication, at step 318. The database may be associated with the field operator, the dispatch center, the locomotive, or an independent location. Other arrangements and configurations are possible.

Figure 4:
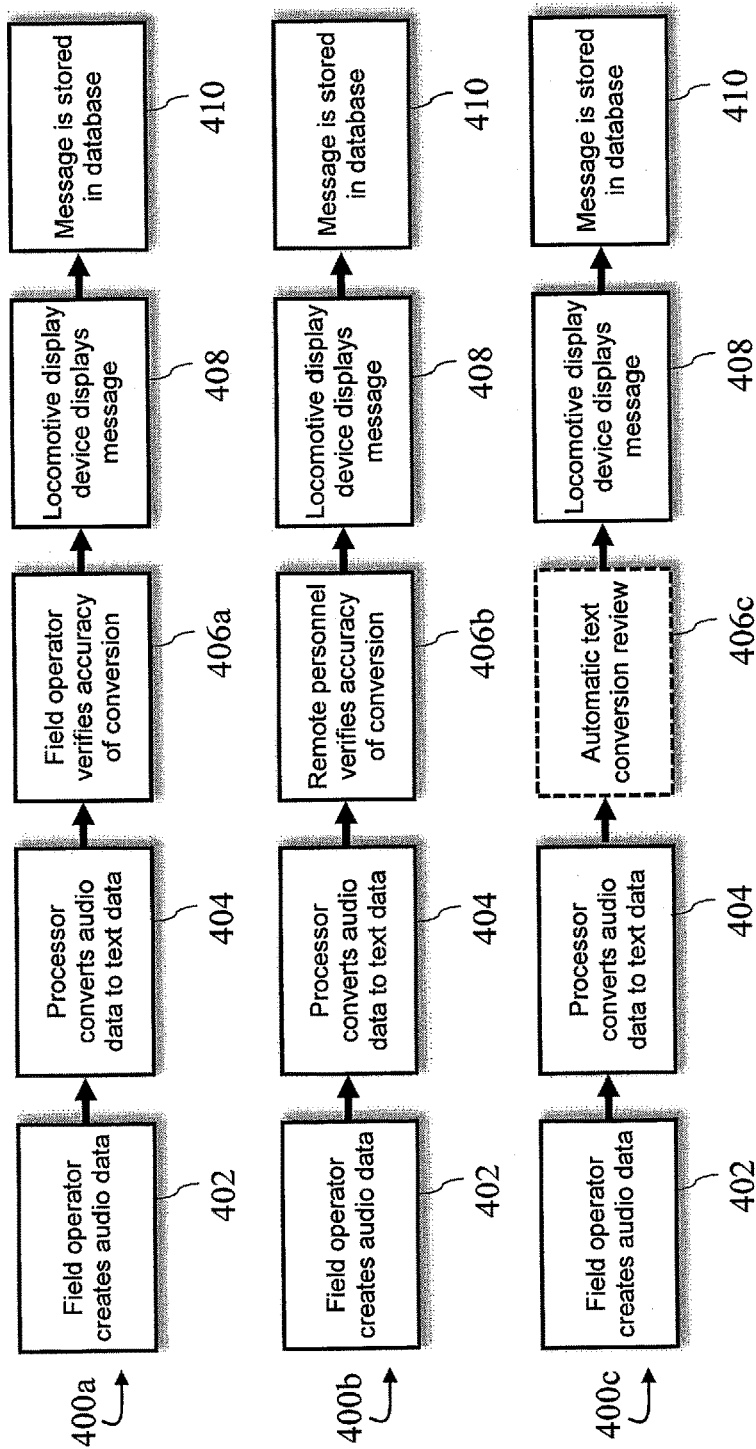

In reference to FIG. 4, and in preferred and non-limiting embodiments or aspects, provided are three step diagrams 400a-400c depicting example audio-to-text conversion, review, display, and storage processes, carried out by the communication network 100. Step diagram 400a shows one example process where generation of the text data is reviewed by a field operator. According to step diagram 400a, in step 402, the field operator begins by generating a message that includes, at least partially, audio data. For example, the field operator may speak a message such as "You have clearance to proceed through the work zone at ten miles per hour." This message is communicated to a processor, which converts the audio data into text data, in step 404. It will be appreciated that the processor in step 404 may be associated with the field operator's communication device, or otherwise may be separate from and communicate with the field operator's communication device. After the audio data is converted to text data in step 404, the processor communicates the text data to the field operator who verifies the accuracy of the conversion, in step 406a. If the text data is not an accurate representation of the spoken message, the field operator may take one or more actions in response, such as cancelling the communication, requesting a new conversion, communicating a new message, or editing the text data. If the text data is an accurate representation of the spoken message, the text data is then communicated to the locomotive where the text data is displayed on a locomotive display device, in step 408. It will be appreciated that the audio data may also be communicated to the locomotive so that the locomotive operator may receive the message without having to read the locomotive display device. Finally, the text data is communicated to and stored in a database, which may be associated with the train, the field operator, or a separate location, such as a dispatch center.

In further reference to FIG. 4, and in a further preferred and non-limiting embodiment or aspect, step diagram 400b depicts one example process where generation of the text data is reviewed by a remote personnel. According to step diagram 400b, in step 402, the field operator begins by generating a message that includes, at least partially, audio data. This message is communicated to a processor, which converts the audio data into text data, in step 404. It will be appreciated that the processor in step 404 may be associated with a dispatch center, or otherwise may be separate from and communicate with the dispatch center. After the audio data is converted to text data in step 404, the processor communicates the text data to a personnel associated with the dispatch center who verifies the accuracy of the conversion, in step 406b. If the text data is not an accurate representation of the spoken message, the personnel may take one or more actions in response, such as cancelling the communication, requesting a new conversion, requesting a new message, or editing the text data. If the text data is an accurate representation of the spoken message, the text data is then communicated to the locomotive where the text data is displayed on a locomotive display device, in step 408. It will be appreciated that the audio data may also be communicated to the locomotive so that the locomotive operator may receive the message without having to read the locomotive display device. Finally, the text data is communicated to and stored in a database, which may be associated with the train, the field operator, the dispatch center, or a separate location.

In further reference to FIG. 4, and in a further preferred and non-limiting embodiment or aspect, step diagram 400c depicts one example process where generation of the text data is not manually reviewed, and instead, the text may be reviewed automatically by a processor. According to step diagram 400c, in step 402, the field operator begins by generating a message that includes, at least partially, audio data. This message is communicated to a processor, which converts the audio data into text data, in step 404. It will be appreciated that the processor in step 404 may be associated with the field operator, a dispatch center, or a separate location. After the audio data is converted to text data in step 404, the processor or a second processor may automatically review the text for quality/accuracy of the conversion, in step 406c. If the text data is not acceptable, the processor or the second processor may take one or more actions in response, such as cancelling the communication, requesting a new conversion, requesting a new message, or editing the text data. If the text data is acceptable, the text data is then communicated to the locomotive where the text data is displayed on a locomotive display device, in step 408. It will be appreciated that the audio data may also be communicated to the locomotive so that the locomotive operator may receive the message without having to read the locomotive display device. Finally, the text data is communicated to and stored in a database, which may be associated with the train, the field operator, the dispatch center, or a separate location. It will be appreciated that other configurations are possible.

Although the invention has been described in detail for the purpose of illustration based on what is currently considered to be the most practical and preferred and non-limiting embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system for communicating instructions to at least one locomotive approaching or traversing a predetermined zone, comprising:
  a first communication device located at or associated with the predetermined zone and configured to communicate audio data from a field operator;
  a second communication device located on or associated with the at least one locomotive;
  at least one processor programmed or configured to:
    receive the audio data from the first communication device;
    convert at least a portion of the audio data to text data; and
    directly or indirectly transmit at least one message to the second communication device, wherein the at least one message comprises at least one of the following: at least a portion of the text data, at least a portion of the audio data, or any combination thereof;
  a locomotive display device in the at least one locomotive configured to display at least a portion of the at least one message received by the second communication device to an operator of the at least one locomotive, and
  at least one database programmed or configured to receive and store at least a portion of the at least one message.

2. The system of claim 1, wherein the at least one database is further programmed or configured to store communication data related to the at least one message, the communication data comprising at least one of the following: geographic data, locomotive identification data, time data, field operator data, locomotive operator data, or any combination thereof.

3. The system of claim 2, wherein the at least one processor is further programmed or configured to, after directly or indirectly transmitting the at least one message, store in the at least one database action data of the at least one locomotive while the at least one locomotive approaches or operates within the predetermined zone, the action data comprising at least one of the following: locomotive location data, locomotive speed data, locomotive direction data, responsive communication data, or any combination thereof.

4. The system of claim 1, further comprising:
 a remote display device associated with a dispatch center, the remote display device programmed or configured to receive the text data from the at least one processor and present the text data to a personnel for review, and
 a speaker associated with the dispatch center, the speaker configured to receive the audio data from the at least one processor and present the audio data to the personnel for comparison to the text data.

5. The system of claim 4, wherein the at least one processor is further programmed or configured to, in response to receiving an instruction from the personnel, directly or indirectly transmit the at least one message.

6. The system of claim 4, wherein the at least one processor is located at or associated with the dispatch center.

7. The system of claim 4, wherein the at least one processor is positioned remotely from the predetermined zone and the dispatch center.

8. The system of claim 1, further comprising a field display device positioned in the predetermined zone, the field display device programmed or configured to receive the text data from the at least one processor and present the text data to the field operator for review and comparison to the audio data that was communicated to the at least one processor by the field operator.

9. The system of claim 8, wherein the at least one processor is further programmed or configured to, in response to receiving an instruction from the field operator, directly or indirectly transmit the at least one message.

10. The system of claim 1, wherein the at least one processor is further programmed or configured to encrypt the at least one message prior to directly or indirectly transmitting the at least one message.

11. A method for communicating instructions to at least one locomotive approaching or traversing a predetermined zone, comprising:
 receiving audio data from a first communication device, the first communication device located at or associated with the predetermined zone and the message spoken by a field operator;
 converting at least a portion of the audio data to text data;
 communicating or facilitating the communication of the text data for display to a dispatch center personnel or the field operator for review of the converting step;
 in response to receiving an instruction from the dispatch center personnel or the field operator, directly or indirectly transmitting at least one message to a second communication device located on or associated with the at least one locomotive, wherein the at least one message comprises at least one of the following: at least a portion of the text data, at least a portion of the audio data, or any combination thereof; and
 storing at least a portion of the at least one message in at least one database.

12. The method of claim 11, further comprising storing in the at least one database communication data related to the at least one message, the communication data comprising at least one of the following: geographic data, locomotive identification data, time data, field operator data, locomotive operator data, or any combination thereof.

13. The method of claim 12, further comprising, after directly or indirectly transmitting the at least one message, storing in the at least one database action data of the at least one locomotive while the at least one locomotive approaches or operates within the predetermined zone, the action data comprising at least one of the following: locomotive location data, locomotive speed data, locomotive direction data, responsive communication data, or any combination thereof.

14. The method of claim 11, further comprising communicating or facilitating the communication of the audio data along with the text data to the dispatch center personnel or the field operator for review of the converting step.

15. The method of claim 14, further comprising encrypting at least one of the audio data and the text data prior to communicating or facilitating the communication of the audio data along with the text data to the dispatch center personnel or the field operator for review of the converting step.

16. The method of claim 11, further comprising encrypting the at least one message prior to directly or indirectly transmitting the at least one message to the second communication device.

17. An apparatus for communicating instructions to at least one locomotive approaching or traversing a predetermined zone, the apparatus comprising at least one non-transitory computer-readable medium having program instructions stored thereon that, when executed by at least one processor, cause the at least one processor to:
 receive audio data from a first communication device, the first communication device located at or associated with the predetermined zone and the message spoken by a field operator;
 convert at least a portion of the audio data to text data;
 communicate or facilitate the communication of the text data for display to a dispatch center personnel or the field operator for review of the converting step;
 in response to receiving an instruction from the dispatch center personnel or the field operator, directly or indirectly transmit at least one message to a second communication device located on or associated with the at least one locomotive, wherein the at least one message comprises at least one of the following: at least a portion of the text data, at least a portion of the audio data, or any combination thereof; and
 store at least a portion of the at least one message in at least one database.

18. The apparatus of claim 17, wherein the program instructions further cause the at least one processor to store communication data related to the at least one message, the communication data comprising at least one of the following: geographic data, locomotive identification data, time data, field operator data, locomotive operator data, or any combination thereof.

19. The apparatus of claim 18, wherein the program instructions further cause the at least one processor to, after directly or indirectly transmitting the at least one message, store action data of the at least one locomotive while the at least one locomotive approaches or operates within the predetermined zone, the action data comprising at least one of the following: locomotive location data, locomotive speed data, locomotive direction data, responsive communication data, or any combination thereof.

20. The apparatus of claim 17, wherein the program instructions further cause the at least one processor to encrypt the at least one message prior to directly or indirectly transmitting the at least one message.

* * * * *